United States Patent Office 3,156,451
Patented Nov. 10, 1964

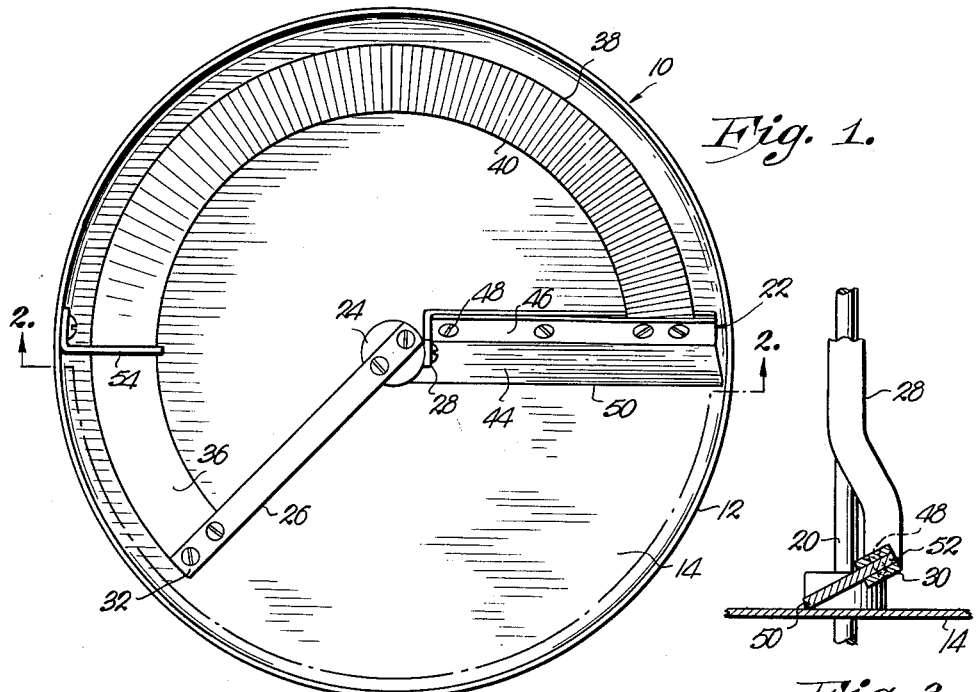
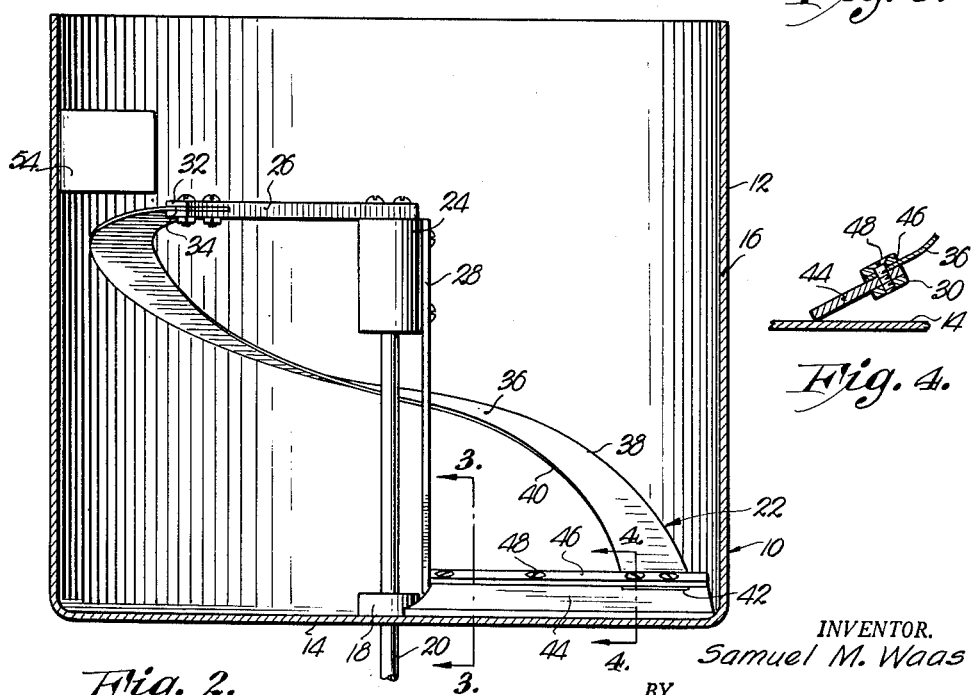

3,156,451
ROTATABLE AGITATOR
Samuel M. Waas, Kansas City, Mo., assignor to Manley, Inc., Kansas City, Mo., a corporation of Missouri
Filed Feb. 16, 1961, Ser. No. 89,810
4 Claims. (Cl. 259—107)

This invention relates to apparatus for use in coating material and more particularly, in caramel coating of popcorn.

It is the most important object of the instant invention to provide a novel rotor assembly capable of imparting a unique action to the material being admixed thereby in that such materials are actually lifted as they revolve in the container, and permitted to successively return to the bottom of the container by gravity so that, because of the tumbling, swirling and somewhat violent, yet non-damaging action imparted thereto, every popped kernel is completely and uniformly coated without the admixture taking on a homogenous cluster with the kernels all stuck together.

Another important object is to provide apparatus which will uniformly mix the ingredients without grinding or breaking the kernels of popped corn.

Still another object of this invention is to provide apparatus having a container wherein the corn may be coated directly after it is popped.

Another object is to provide an apparatus having means to prevent the coating material from sticking and carbonizing on the bottom of the container.

A further object is to provide such apparatus with means for elevating a liquid coating material from the bottom of the container to a position for contacting the kernels of popped corn.

Still another object is to provide such apparatus having means to prevent the coated material from adhering to the rotating agitator.

A yet further object is the provision of apparatus having a minimum of parts, and which may be quickly and easily disassembled for cleaning.

In the drawing:

FIGURE 1 is a top plan view of a rotatable agitator made pursuant to my present invention showing the same within a combined popping and caramelizing kettle;

FIG. 2 is a cross-sectional view taken along line 2—2 of FIG. 1;

FIG. 3 is a fragmentary, detailed, cross-sectional view along line 3—3 of FIG. 2; and FIG. 4 is a fragmentary, detailed, cross-sectional view along line 4—4 of FIG. 2.

In the form of the invention chosen for illustration, an agitator assembly generally designated 10, is provided with an open top container 12 having a bottom 14, and a preferably cylindrical side wall 16. A cylindrical bearing 18 is fastened on the center of bottom 14 and journals a rotatable shaft 20 passing through bottom 14 and extending vertically into container 12.

A rotor, broadly designated 22, includes a vertically disposed, cylindrical socket member 24 having a rigid, elongated, horizontal, radial arm 26 rigidly coupled at one end thereof to member 24. A rigid, elongated bar 28 is rigidly coupled to the side of member 24 and depends vertically therefrom. A second rigid, radial arm 30 preferably integral with bar 28 at the lower end of the latter, extends horizontally and terminating adjacent wall 16.

Arm 26 is bifurcated adjacent the outer end 32 to receive an end 34 of an elongated, helical vane 36 of sheet material, having an outer peripheral edge 38 and an inner peripheral edge 40. The opposite end of vane 36 is spaced vertically from end 32 and is adjacent radial arm 30. Edge 38 is concentric with, and spaced from wall 16.

Edge 40 is spaced from the axis of rotation of rotor 22 as clearly shown in FIGS. 1 and 2.

An elongated blade 44 of flexible material such as plastic or the like, is secured to arm 30 having one edge overlying the latter. An elongated clamping bar 46 overlies arm 30 and edge of blade 44 and is rigidly fastened to arm 30 by screws 48. The screws 48 pass through blade 44, thereby clamping the latter between the arm 30 and bar 46. Blade 44 is transversely inclined so that it presents a leading edge 50 in contact with the face of bottom 14 and it extends from bearing 18 to wall 16.

A trailing edge 52 of the blade 44 is disposed adjacent the lower end of vane 36, the latter being clamped between bar 46 and blade 44 as shown. The member 24 is provided with a longitudinal aperture (not shown) for receiving one end of shaft 20 which is rigidly coupled to member 24 in any suitable fashion. An inwardly protruding, L-shaped deflector plate 54 is rigidly fastened to side wall 16 in a position above arm 26.

In operation, container 12 is disposed above a heating unit in the conventional manner. Predetermined quantities of raw popcorn and caramelizing material are placed inside of the container 12. Shaft 20 is connected to suitable mechanical means for rotating the latter. As the shaft 20 rotates, rotor 22, which is rigidly coupled thereto, is likewise rotated within container 12. When the temperature within the container 12 is raised sufficiently to cause the popcorn to pop and the caramelizing substance to become liquid, the popcorn is agitated by rotor 22. Blade 44 extending from bearing 18 to wall 16, wipes the caramelizing substance from off the bottom 14 and tends to elevate it to be in a position to contact the popped corn. As the caramelizing substance contacts the corn, it tends to adhere to the grains. The corn and caramelizing substance are elevated by helical vane 36.

Those grains which have not yet contacted the sticky caramelizing substance will not be elevated by vane 36, as well as those which are sticky and tend to adhere together. Instead, those grains will tend to fall from vane 36 and return adjacent bottom 14 where they again will be in a position to contact the caramelizing substance.

As the caramelized corn reaches the vicinity of arm 26, the latter is rotated beneath plate 54 which will disengage any corn which is adhering to the end 34. As such corn is disengaged, it will fall to the bottom 14 where it will be in a position to be elevated by blade 44 and vane 36 as previously described. Radial arms 26 and 30 are angularly spaced to allow for that material disengaged by plate 54 to fall to bottom 14 before recontacting blade 44.

The repeated elevating and gravitational return of the material within container 12 not only thoroughly mixes the material with the caramelizing substance, but also tends to coat each individual grain of the popcorn and break up any tendency for the grains to adhere together. The agitation of the material by rotor 22 is gentle so that the grains of popped corn are not broken or disintegrated.

The importance of blade 44 should not be overlooked since it performs a number of functions. Initially, the caramelizing material, usually in the granular form, becomes liquid and is admixed with the raw kernels and seasoning such as salt and cottonseed oil or the like. The bottom 14 must become rather hot to dissolve the ingredients and cause the kernels to pop. Blade 44 not only stirs such substances, but keeps them from burning and scorching and equally important, keeps the bottom 14 scraped clean so that the materials do not cling to and burn on the hot upper surface of bottom 14. It is for this reason that the lower leading edge 50 should wipe along bottom 14 all the way from bearing 18 to side wall 16.

Furthermore, after popping commences, blade 44 immediately lifts the admixture and starts the caramelizing, and throughout the operation, blade 44 continues to raise the liquids off the bottom 14 so that they will come into contact with the popped corn. Blade 44 is, therefore, more than a mere agitator for raw kernels as in conventional popping kettles.

Again, blade 44 serves the very important purpose of continually raising the popped corn and the caramelizing material off the bottom 14 and feeding the same to the vane 36 so that the latter will, by its very shape, size and disposition, take over the lifting action and cause the admixture to advance along the upper face of vane 36 to ultimately tumble over the trailing edge of arm 26 as augmented by the action of plate 54.

Having thus described the invention, what is claimed as new and desired to be secured by Letters Patent is:

1. In combination with a container having a bottom, a vertical, rotatable, drive shaft in the container, and a side wall extending upwardly from said bottom, a rotor provided with:

hub structure secured to and extending along said shaft for rotation therewith;

a helical, transversely flat vane having a pair of spaced ends;

means securing the ends of said vane to said hub structure adjacent the upper and lower extremities of the latter respectively to dispose said ends in vertically spaced relationship and to position said vane at least partially about said shaft in laterally spaced relationship to said hub structure to thereby present a vertically disposed material passage extending through the space between said hub structure and said vane;

material pickup means mounted on the securing means adjacent the lower end of said vane, substantially spanning the horizontal distance between said hub structure and said lower end of the vane and disposed in wiping relationship to said bottom for wiping the latter and directing material toward said lower end of the vane as said shaft is rotated, said vane being disposed to receive material at said lower end thereof from said pickup means and to elevate the material within the container for gravitational return flow through said passage from the uppermost end of the vane and from the vane throughout its length along both longitudinal edges of the vane during continuous rotation thereof, whereby to circulate, tumble and agitate the material; and deflector means carried by said container in overlying relationship to the generally cylindrical path of travel of said vane and positioned to engage and dislodge material from the upper surface of the vane at the upper end thereof as said upper end moves by said deflector means during rotation of the shaft, whereby the free gravitation of the material to the bottom for further mixing is enhanced.

2. The invention of claim 1, wherein said pickup means comprises an elongated blade, longitudinally radial to the axis of rotation of the shaft and transversely inclined, presenting a lowermost, longitudinal, leading edge in wiping engagement with said face, the lower end of the vane being in trailing relationship to the blade.

3. The invention of claim 2, wherein said blade extends from adjacent the wall to adjacent said axis.

4. The invention of claim 3, wherein the vane has an innermost spiral edge spaced radially outwardly from said hub structure whereby to define said material passage, said lower end of the vane being connected with the blade adjacent the rearmost and uppermost edge of the latter and adjacent the outermost end of the blade.

References Cited in the file of this patent

UNITED STATES PATENTS

| | | |
|---|---|---|
| 811,145 | Higgins | Jan. 30, 1906 |
| 954,511 | Gordon | Apr. 12, 1910 |
| 1,520,375 | Trust et al. | Dec. 23, 1924 |
| 2,082,796 | Gaertner | June 8, 1937 |
| 2,390,460 | Presser | Dec. 4, 1945 |